(12) United States Patent
Nequist et al.

(10) Patent No.: US 7,721,235 B1
(45) Date of Patent: May 18, 2010

(54) METHOD AND SYSTEM FOR IMPLEMENTING EDGE OPTIMIZATION ON AN INTEGRATED CIRCUIT DESIGN

(75) Inventors: Eric Nequist, Monte Sereno, CA (US); Richard Brashears, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 322 days.

(21) Appl. No.: 11/648,128

(22) Filed: Dec. 29, 2006

Related U.S. Application Data (60) Provisional application No. 60/817,622, filed on Jun. 28, 2006.

(51) Int. Cl.
*G06F 17/50* (2006.01)
(52) U.S. Cl. .................. 716/4; 716/10; 716/14; 716/19
(58) Field of Classification Search .......... 716/2, 716/4, 8, 10, 12, 14, 19
See application file for complete search history.

(56) References Cited

U.S. PATENT DOCUMENTS

| | | | | |
|---|---|---|---|---|
| 6,317,864 B1 * | 11/2001 | Kikuchi et al. | ............. | 716/11 |
| 6,678,874 B1 * | 1/2004 | Jochym et al. | ............. | 716/11 |
| 6,829,754 B1 * | 12/2004 | Yu et al. | ............. | 716/5 |
| 7,065,729 B1 * | 6/2006 | Chapman | ............. | 716/13 |
| 7,174,529 B1 * | 2/2007 | Hetzel | ............. | 716/13 |
| 7,310,793 B1 * | 12/2007 | Teig et al. | ............. | 716/13 |
| 7,340,710 B1 * | 3/2008 | Hoerold et al. | ............. | 716/12 |
| 7,370,307 B2 * | 5/2008 | Seta | ............. | 716/12 |
| 7,441,220 B2 * | 10/2008 | Hetzel et al. | ............. | 716/12 |
| 7,448,014 B2 * | 11/2008 | Lavin et al. | ............. | 716/12 |
| 7,472,366 B1 * | 12/2008 | Hetzel et al. | ............. | 716/13 |
| 2005/0273746 A1 * | 12/2005 | Malhotra et al. | ............. | 716/13 |
| 2005/0273748 A1 * | 12/2005 | Hetzel et al. | ............. | 716/14 |
| 2006/0064654 A1 * | 3/2006 | Zhang et al. | ............. | 716/2 |
| 2006/0117231 A1 * | 6/2006 | Hoffman et al. | ............. | 714/718 |
| 2006/0118967 A1 * | 6/2006 | Suga | ............. | 257/774 |
| 2006/0277517 A1 * | 12/2006 | Zhang et al. | ............. | 716/13 |
| 2006/0288322 A1 * | 12/2006 | Zhang et al. | ............. | 716/9 |
| 2007/0044060 A1 * | 2/2007 | Waller | ............. | 716/13 |
| 2007/0089073 A1 * | 4/2007 | Falbo et al. | ............. | 716/2 |
| 2007/0101303 A1 * | 5/2007 | Lien et al. | ............. | 716/5 |
| 2007/0117231 A1 * | 5/2007 | Suga | ............. | 438/14 |
| 2007/0136714 A1 * | 6/2007 | Cohn et al. | ............. | 716/13 |
| 2007/0192751 A1 * | 8/2007 | Sinha et al. | ............. | 716/2 |
| 2007/0256046 A1 * | 11/2007 | Pikus et al. | ............. | 716/16 |
| 2007/0294648 A1 * | 12/2007 | Allen et al. | ............. | 716/4 |
| 2008/0046852 A1 * | 2/2008 | Bergman Reuter et al. | ..... | 716/10 |
| 2008/0163134 A1 * | 7/2008 | Nequist et al. | ............. | 716/2 |

* cited by examiner

*Primary Examiner*—Stacy A Whitmore
(74) *Attorney, Agent, or Firm*—Vista IP Law Group LLP (57) ABSTRACT

Disclosed is a method, system, and computer program product for performing edge optimization on an electronic design. According to some approaches, the number of edges and/or the length of edges within an IC design are configured for optimized manufacturability and yield of an integrated circuit. The edge optimization may occur in real-time during layout, placement, and/or routing, or occur in a post-optimization step.

28 Claims, 9 Drawing Sheets

METHOD AND SYSTEM FOR IMPLEMENTING EDGE OPTIMIZATION ON AN INTEGRATED CIRCUIT DESIGN

CROSS-REFERENCE TO RELATED APPLICATIONS

The present application claims the benefit of U.S. Provisional Application No. 60/817,622, filed on Jun. 28, 2006, which is hereby incorporated by reference in its entirety.

BACKGROUND AND SUMMARY

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may uses a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist.

Based upon this geometric information, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer.

The manufacturability of modern IC designs using conventional optical lithography technology is increasingly being challenged by the sub wavelength, or low-kl, dimensions of the critical. IC feature geometries. Not only are the critical dimension feature geometries decreasing in size in accordance with, or even faster than, Moore's Law predictions, the already large number of these feature geometries is growing at a dramatic rate as well. Furthermore, due to the necessity to mitigate optical proximity effect distortions through resolution enhancement techniques at the mask level, the overall polygonal figure count is skyrocketing. These critical feature geometries are patterned far more precisely as well due to the severity and sensitivity of the non-linear imaging. Extreme precision is required for sub wavelength, or low-kl, applications due to highly non-linear imaging behaviors which often magnify mask errors by large factors and non-intuitive manners.

In deep submicron design, a significant amount of time and effort is usually spent dealing with design manufacturability rules. The problem is that conventional approaches for handling design rules tend to break down when handling deep submicron designs.

The present invention is directed to a method, system, and computer program product for performing edge optimization on an electronic design. According to some embodiments, the number of edges and/or the length of edges within an IC design are configured for optimized manufacturability and yield of an integrated circuit. The edge optimization may occur in real-time during layout, placement, and/or routing, or occur in a post-optimization step. Other and additional objects, features, and advantages of the invention are described in the detailed description, figures, and claims.

DETAILED DESCRIPTION

Conventional electronic design tools do not specifically focus on edge characteristics and optimization when placing and routing layout objects. However, conventional approaches for handling electronic designs and design rules tend to break down when handling deep submicron designs. In particular, with smaller designs such as 65 nanometer designs, 45 nanometer designs, or even smaller designs, the edge characteristics of layout objects may critically affect the manufacturability, reliability, and operability of integrated circuits.

Figure 1:
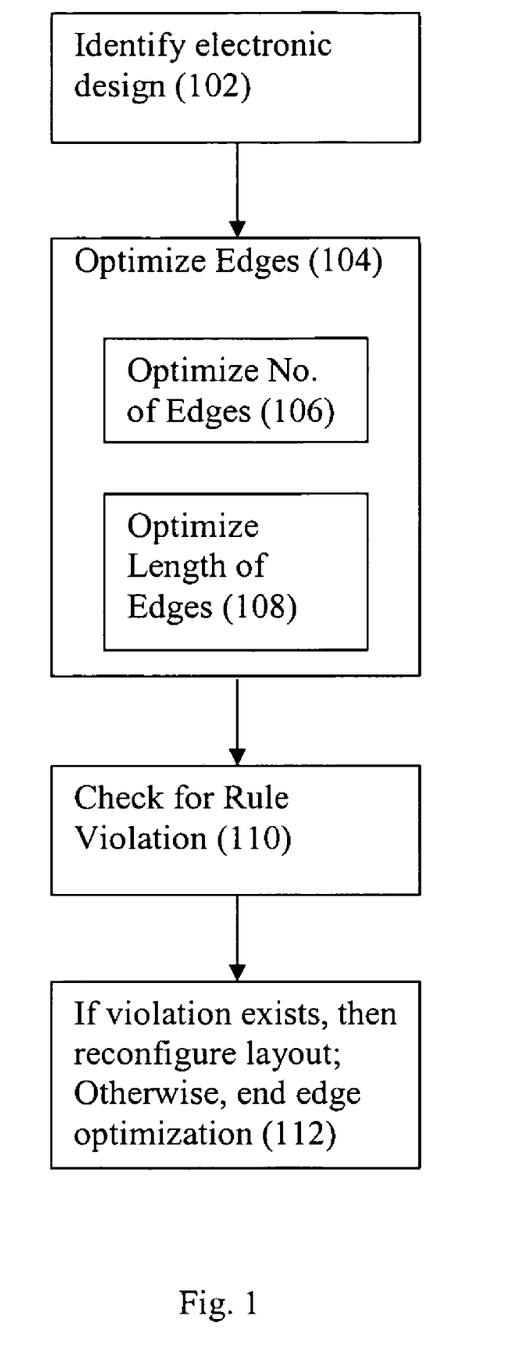
FIG. 1 shows a flowchart of a process for performing edge optimization according to some embodiments of the invention.

The present invention is directed to a method, system, and computer program product for performing edge optimization on an electronic design. FIG. 1 shows a flowchart of a process for performing edge optimization according to some embodiments of the invention. The process begins by identifying an electronic design to be optimized (102).

The layout objects are analyzed and adjusted to optimize the objects' edge characteristics (104). In some embodiments, edge optimization is performed to optimize the number of edges, e.g., by reducing the number of edges in the IC design (106). There are numerous advantages for implementing a design having fewer edges. For example, the fewer the number of edges, the better exposure is received for the manufactured product, thereby reducing potential exposure problems. In addition, a smaller number of edges will result in fewer manufacturing defects and increase yield. Moreover, smaller numbers of edges will reduce manufacturing costs since photomasks become less complicated to manufacture and inspect for defects.

In some embodiments, edge optimization to optimize edge lengths, e.g., by removing inappropriately small edges in the layout (108). This is very counterintuitive since larger scale design processes may actually impose strict rules restricting the use of long edges in the design. However, the present embodiment, particularly when used with 65 nanometer designs, 45 nanometer designs, or even smaller designs, performs edge optimization to lengthen edges and remove small edges if they appear in the design.

The layout is checked to make sure that the edge optimizations did not introduce any violations of design rules in the layout (110). If violations of the design rules exist, then the layout is reconfigured to correct or remove the violations (112). Otherwise, the edge optimization process is completed.

Figure 2:
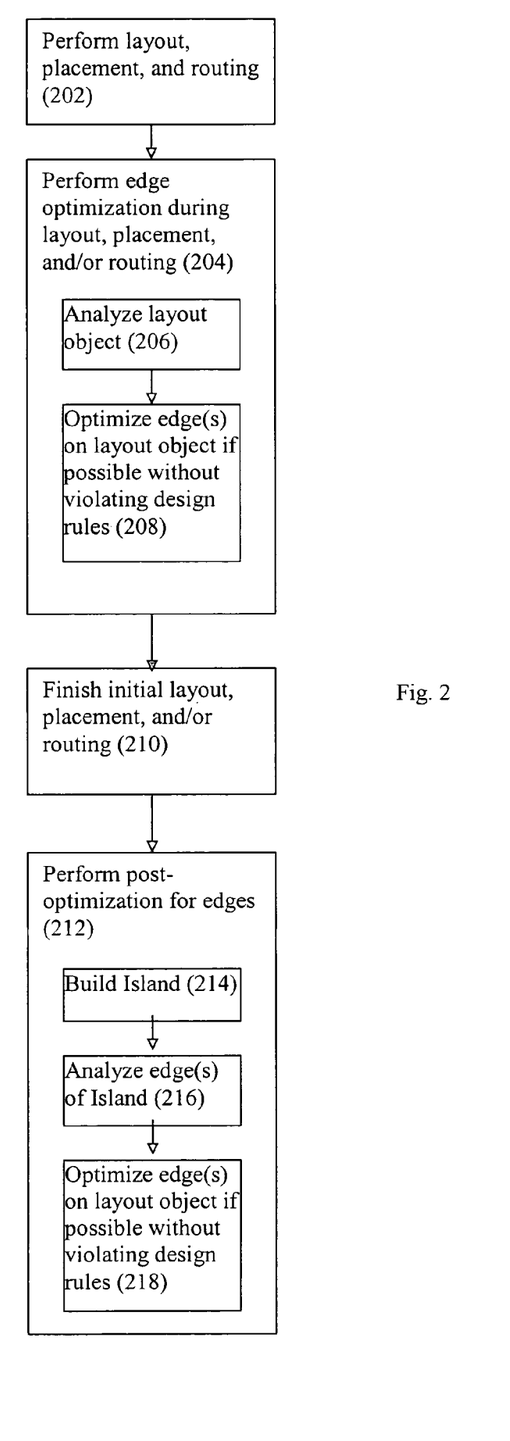
FIG. 2 shows a flowchart of a process for performing edge optimization which addresses timing of optimization actions according to some embodiments of the invention.

FIG. 2 shows a flowchart of a process for edge optimization that addresses the timing of the optimization actions. The edge optimization activity may occur at any phase of the electronic design process.

The process performs layout, placement, and routing activities (202). In some embodiments, edge optimization occurs in real-time during the layout, placement, and/or routing stage (204). Edge optimization is performed by analyzing in real-time the layout object that is being placed or routed (206), and optimizing the edge characteristics of that layout object if it is possible to do so without violating design rules (208). Such edge optimizations include, for example, optimizations to reduce or eliminate small edges and to increase edge lengths. The initial layout, placement, and routing actions are completed at the appropriate stage (210).

Post-optimizations can then be performed after the initial layout has been completed (212). Edge post-optimizations can be performed by building "islands" within the layout (214). An island refers to a set of objects which are to be collected together and analyzed as a group or collective whole. In some embodiments, an object belongs to an island with another object if they short together on the same layer of the IC design, whether directly or indirectly.

The edges of the island are analyzed to determine whether and which type of edge optimizations may be performed upon objects in the island (216). The edge characteristics of that layout object(s) in the island are optimized if it is possible to do so without violating design rules (218). Such edge optimizations include, for example, optimizations to reduce or eliminate small edges and to increase edge lengths.

One type of edge optimization that may be performed is to change the width/size of layout objects to match the width/size of other objects that connect to the first object. This technique may serve to reduce the overall number of edges and may also be used to remove small edges from the design.

Figure 3:
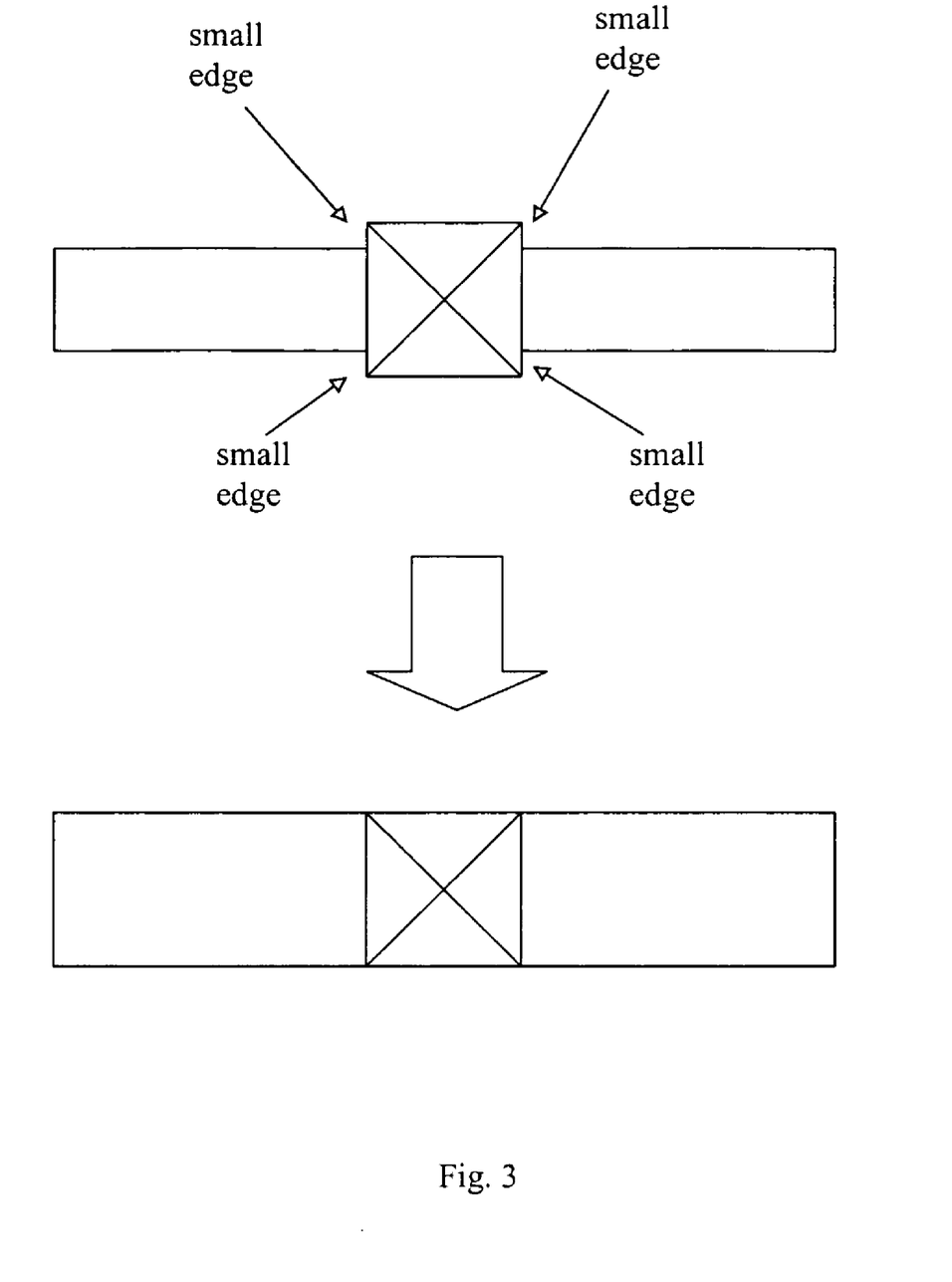
FIGS. 3-8 illustrate example edge optimizations.

FIG. 3 shows an example of this type of edge optimization. The initial layout includes a first wire object connecting to one side of a via and a second wire object connecting to the other side of the same via. The notable feature of the initial layout is that the width of the two wire objects are significantly narrow as compared to the width of the via object. This creates four excessively small edges at the corners of the via object.

The edge optimization in this example is to change the width of the wire objects to match the width of the via object. This removes all four of the excessively small edges from the layout. In addition, this optimization causes long edge lengths to exist along both the upper and lower boundaries of the combined grouping of objects.

Figure 4:
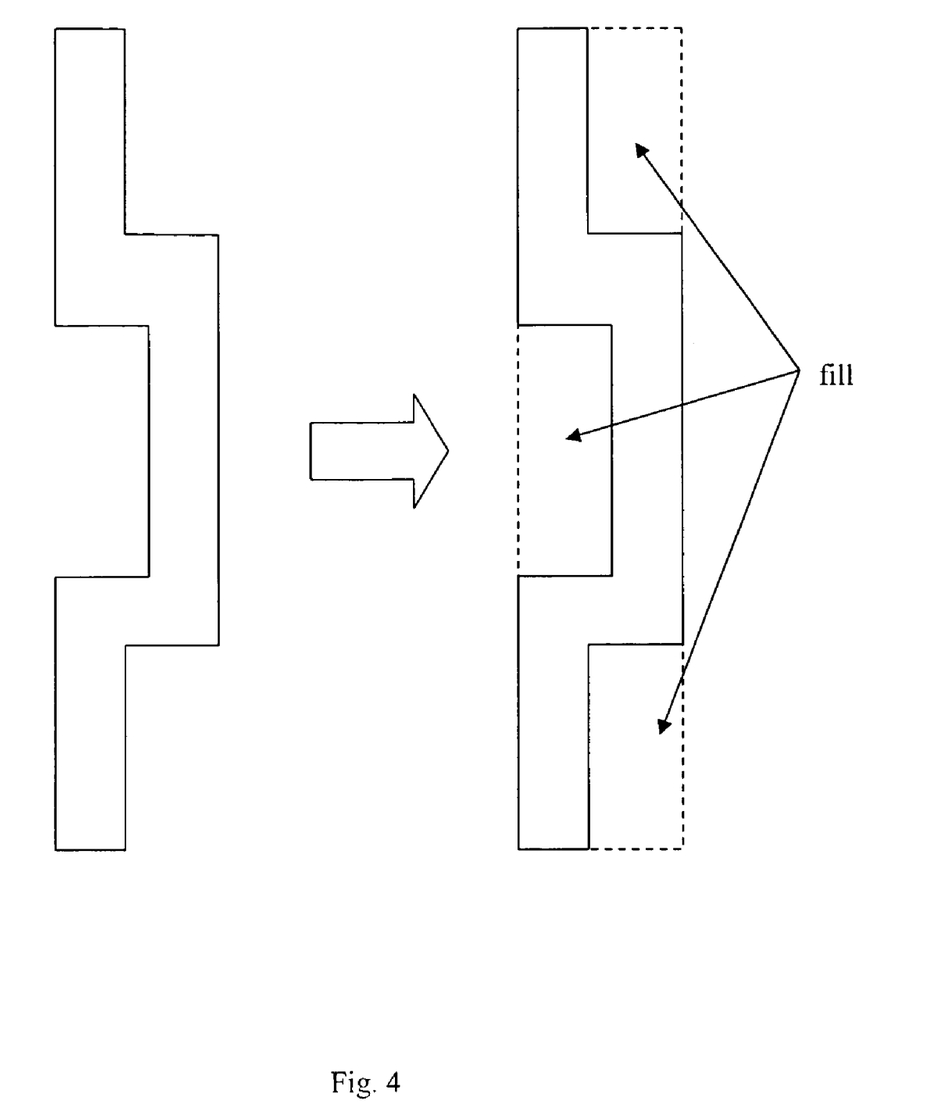

Another type of edge optimization that may be performed is to fill in spaces adjacent to layout objects to remove small edges and increase edge lengths. FIG. 4 shows an example of this type of edge optimization. The initial layout includes a wire route having a series of jogs that creates multiple numbers of short edges in the layout.

The edge optimization in this example is to fill in adjacent spaces next to the jog portions of the wire. This removes the jogs from the layout object, which essentially removes all of the small edges from the layout. In addition, this optimization causes long edge lengths to exist along both the left and right boundaries of the wire object.

Figure 5:
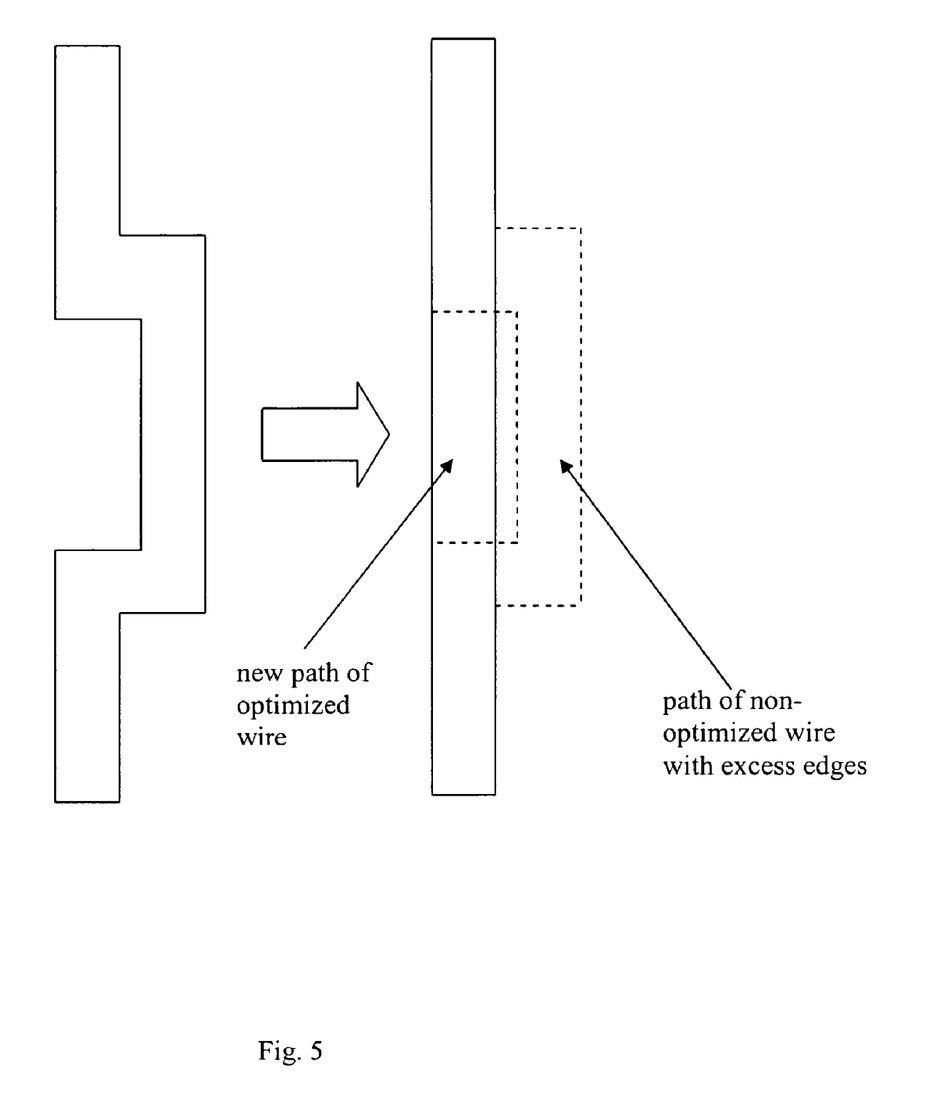

Yet another type of edge optimization is to straighten objects that include jogs and turns. FIG. 5 shows an example of this type of edge optimization. The initial layout includes a wire route having a series of jogs that creates multiple numbers of short edges in the layout.

The edge optimization in this example is to straighten the wire object. This removes the jogs from the layout object, which removes all of the small edges from the layout. In addition, this optimization causes long edge lengths to exist along both the left and right boundaries of the wire object. This approach may be more advantageous to the approach shown in FIG. 4 since it may be easier to accomplish without violating design rules.

An additional type of edge optimization is to change the orientation of objects to make sure that the objects enter and exit other objects to minimize turns and changes of direction. Instead, the orientation of objects is configured to provide a preference for objects that enter and leave other objects along the same orientation.

Figure 6:
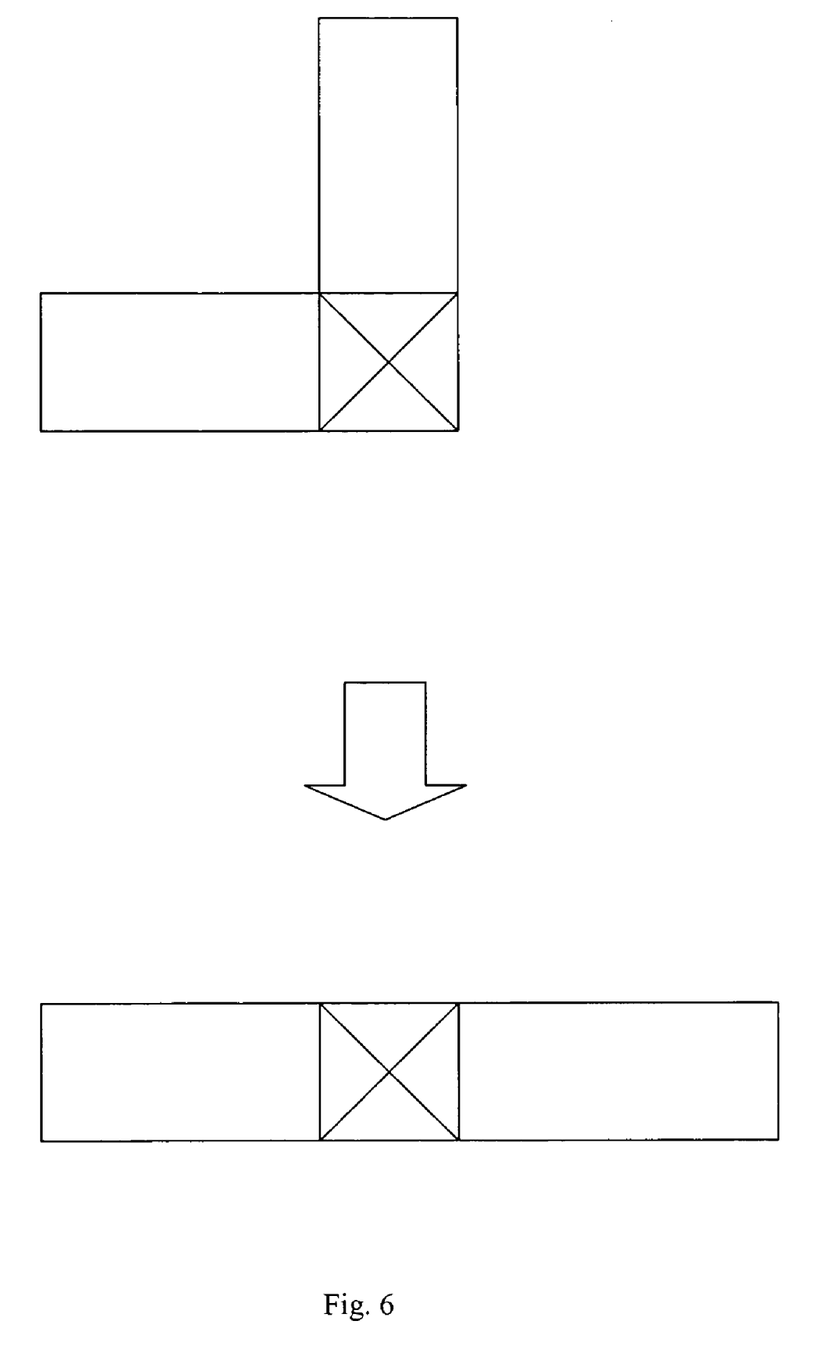

FIG. 6 shows an example of this type of edge optimization. The initial layout includes a wire object that enters a via object horizontally from the side. Another wire object exits the wire object in a vertical direction along the top boundary of the via object. This configuration creates four medium length edges in the layout.

The edge optimization in this example is change the orientation of one of the wire objects to match the orientation of the other wire object. In this example, this means moving the wire object that previously exits in a vertical direction, and having this wire object exit horizontally from the right boundary of the via object. This configuration results in fewer overall edges which are now have longer lengths (from four medium length edges in the layout to two larger length edges).

Figure 7:
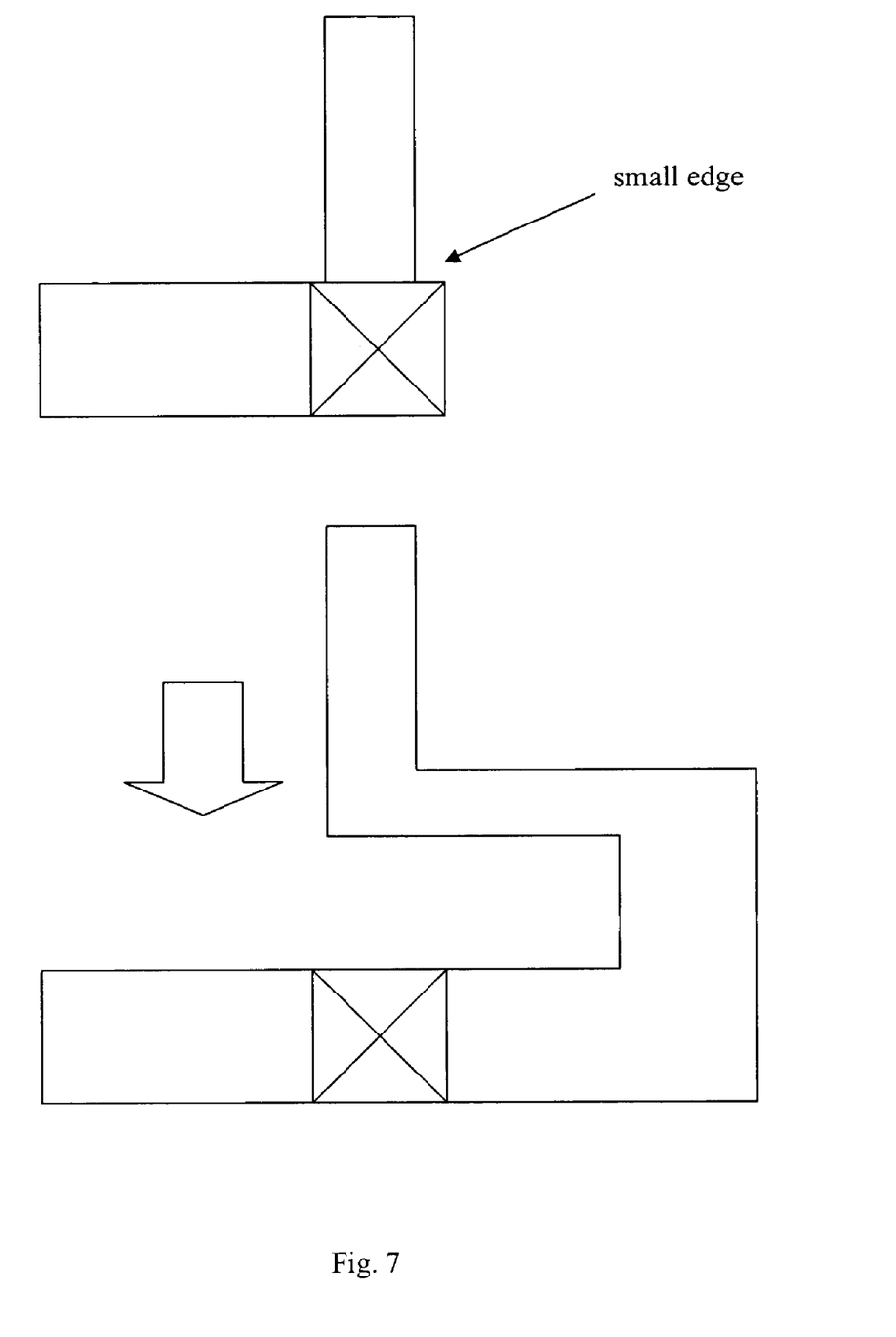

Yet another type of edge optimization is to focus on removing small edges from the layout, even if it increases the overall number of longer edges in the design. FIG. 7 shows an example of this type of edge optimization. The initial layout includes a wire object that enters a via object horizontally from the side. Another wire object exits the wire object in a vertical direction along the top boundary of the via object. The vertical wire object has a smaller width than the via object, causing a small edge to be created on the upper right corner of the via object.

The edge optimization in this example is change the path of the vertical wire object to connect to the via object from the right side boundary. The new wire object has a width that matches the width of the via object. While this configuration results in an overall increase in the number of longer edges, it removes the small edges that originally appeared in the layout.

Another type of edge optimization is add fill (or, otherwise change the width of an object) to match the width of a first object to the width of a second object. The approach may serve to reduce the overall number of edges and to remove or eliminate excessively small edges from the design.

Figure 8:
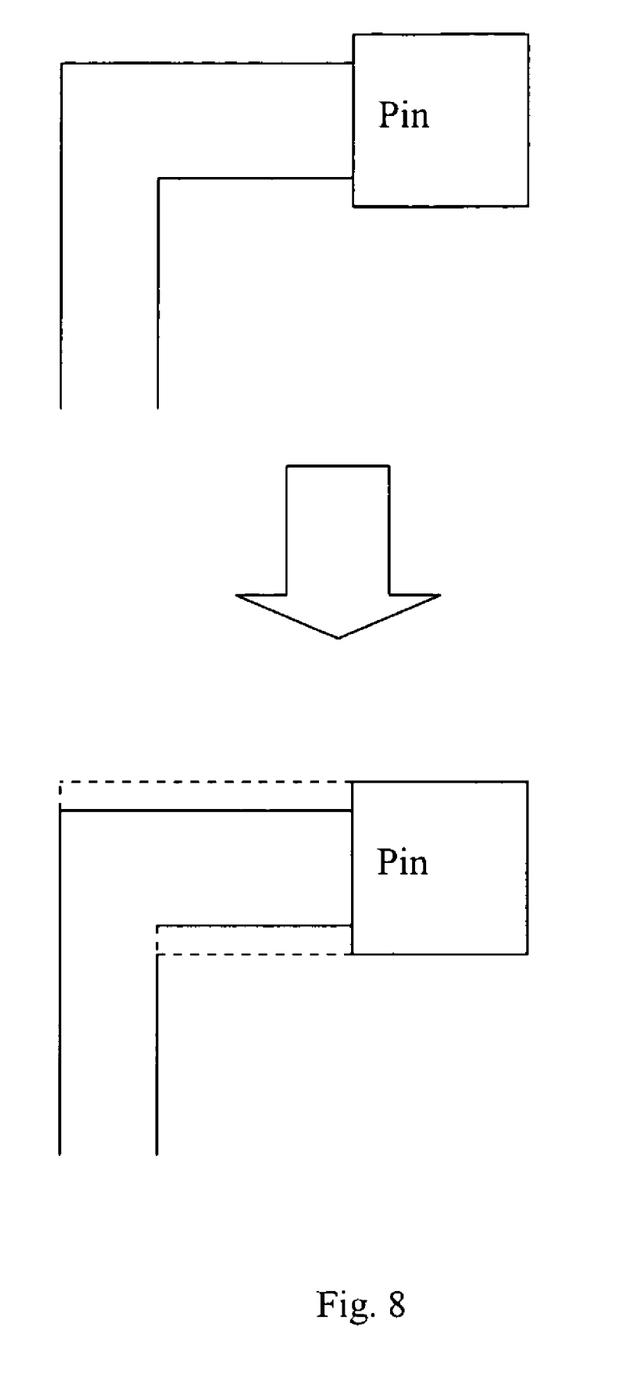

FIG. 8 shows an example of this type of edge optimization. The initial layout includes a wire object having a right angle turn that enters a pin object horizontally from the side. The wire object has a width that is smaller than the width of the pin object. This creates two excessively small edges in the design.

The edge optimization in this example is fill in the space adjacent to the wire object so that the new width of the wire object matches the width of the pin object. This removes all of the excessively small edges. In addition, this optimization causes longer edge lengths to exist along both the upper and lower boundaries of the combined grouping of objects near the pin object.

Figure 9:
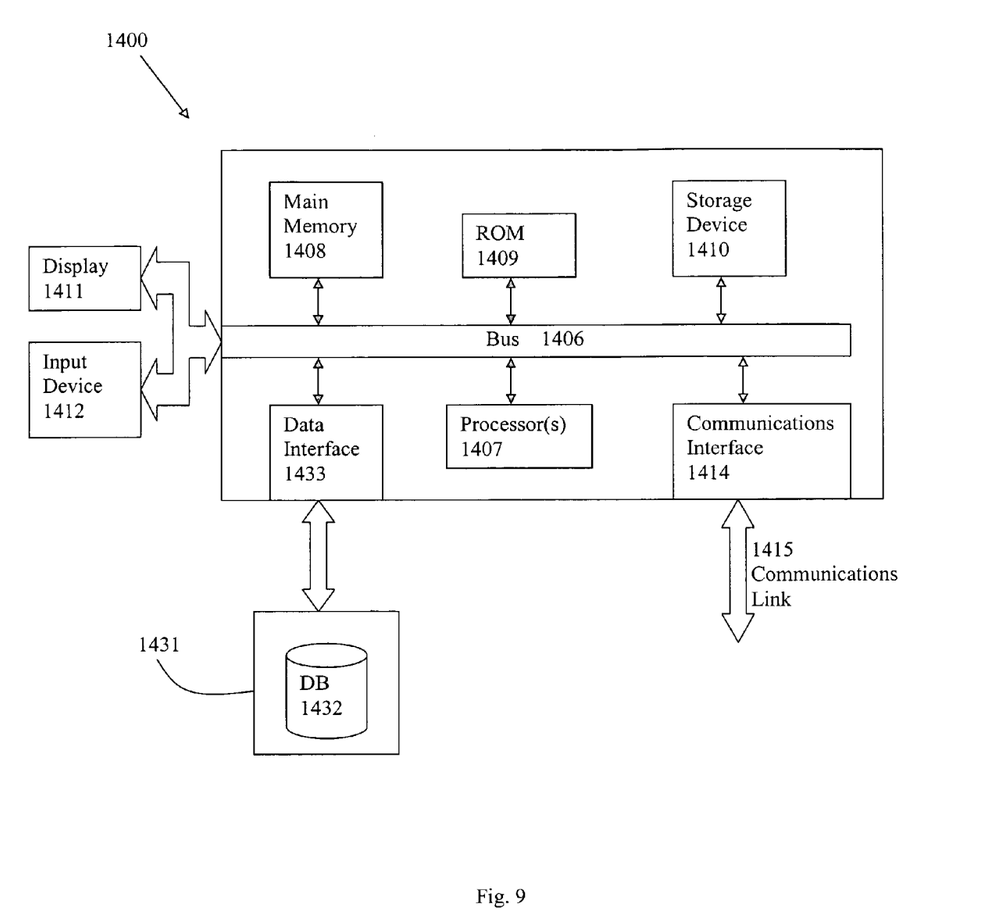
FIG. 9 illustrates an example computing architecture with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for optimizing edges of objects in an electronic circuit design, comprising:
   using a computer system which comprises at least one processor and is configured for performing:
   identifying an object which is to be placed or routed in an electronic design and comprises one or more edges;
   determining an optimization for the object to optimize one or more edge characteristics of one or more edges of the object;
   optimizing the one or more edge characteristics of the object based at least in part upon the optimization during placement or routing stage of generating the electronic circuit design, wherein the act of optimizing increases a length of one of the one or more edges; and
   storing the optimization in a computer readable storage medium or a storage or displaying the optimization in a display apparatus of the computer system.

2. The computer-implemented method of claim 1 in which the one or more edge characteristics that is optimized comprises optimizing the number of edges associated with the object.

3. The computer-implemented method of claim 2 in which the number of edges is reduced.

4. The computer-implemented method of claim 1 in which the one or more edge characteristics that are optimized comprise the length of an edge associated with the object.

5. The computer-implemented method of claim 4 in which the edge is lengthened.

6. The computer-implemented method of claim 4 in which a small edge is removed.

7. The computer-implemented method of claim 1 in which a design rule check is performed to check for a design rule violation based upon the optimization.

8. The computer-implemented method of claim 1 in which edge optimization is performed during layout, placement, or routing.

9. The computer-implemented method of claim 1 in which edge optimization is performed as post-optimization after layout, placement, or routing.

10. The computer-implemented method of claim 1 in which the one or more edge characteristics that is optimized comprises changing a first size of a first layout object to match a second size of a second layout object.

11. The computer-implemented method of claim 10 in which width sizes are matched.

12. The computer-implemented method of claim 11 in which a wire width is changed to match a via width.

13. The computer-implemented method of claim 1 in which the one or more edge characteristics that is optimized comprises filling in spaces near the object to remove edges.

14. The computer-implemented method of claim 13 in which a wire jog is removed.

15. The computer-implemented method of claim 1 in which the one or more edge characteristics that is optimized comprises straightening the object.

16. The computer-implemented method of claim 15 in which a wire jog or turn is removed.

17. The computer-implemented method of claim 1 in which the one or more edge characteristics that is optimized comprises changing an orientation of the object.

18. The computer-implemented method of claim 17 in which a wire direction is changed.

19. The computer-implemented method of claim 1 in which the one or more edge characteristics that is optimized comprises changing an entry or exit point for a wire object.

20. The computer-implemented method of claim 1 in which the one or more edge characteristics that is optimized comprises changing a wire path.

21. A computerized system for optimizing edges of objects in an electronic circuit design, comprising:

means for identifying an object in an electronic design having one or more edges;

means for determining an optimization for the object to optimize one or more edge characteristics of the object;

a processor configured for optimizing the one or more edge characteristics of the object based at least in part upon the optimization during placement or routing stage of generating the electronic circuit design, wherein the act of optimizing the one or more edge characteristics of the object is performed by a processor; and a computer readable storage medium or a storage device configured for storing the optimization or a display apparatus configured for displaying the optimization.

22. A computer program product that includes a computer readable storage medium, the computer readable storage medium comprising a plurality of computer instructions which, when executed by a processor, cause the processor to execute a process for optimizing edges of objects in an electronic circuit design, the process comprising:

identifying an object in an electronic design having one or more edges;

determining an optimization for the object to optimize one or more edge characteristics of the object;

optimizing the one or more edge characteristics of the object based at least in part upon the optimization during placement or routing stage of generating the electronic circuit design, wherein the act of optimizing the one or more edge characteristics of the object is performed by a processor; and storing the optimization in a computer readable storage medium or a storage or displaying the optimization in a display apparatus.

23. The computerized system of claim 21, in which the one or more edge characteristics that is optimized comprises changing a first size of a first layout object to match a second size of a second layout object.

24. The computerized system of claim 23, in which width sizes are matched.

25. The computerized system of claim 24, in which a wire width is changed to match a via width.

26. The computer program product of claim 22, in which the one or more edge characteristics that is optimized comprises changing a first size of a first layout object to match a second size of a second layout object.

27. The computer program product of claim 26, in which a wire width is changed to match a via width.

28. The computer program product of claim 27, in which a wire width is changed to match a via width.

* * * * *